H. B. LESTER.
AUTOMATIC SCREW MACHINE.
APPLICATION FILED SEPT. 25, 1907.
916,461.
Patented Mar. 30, 1909.
14 SHEETS—SHEET 7.
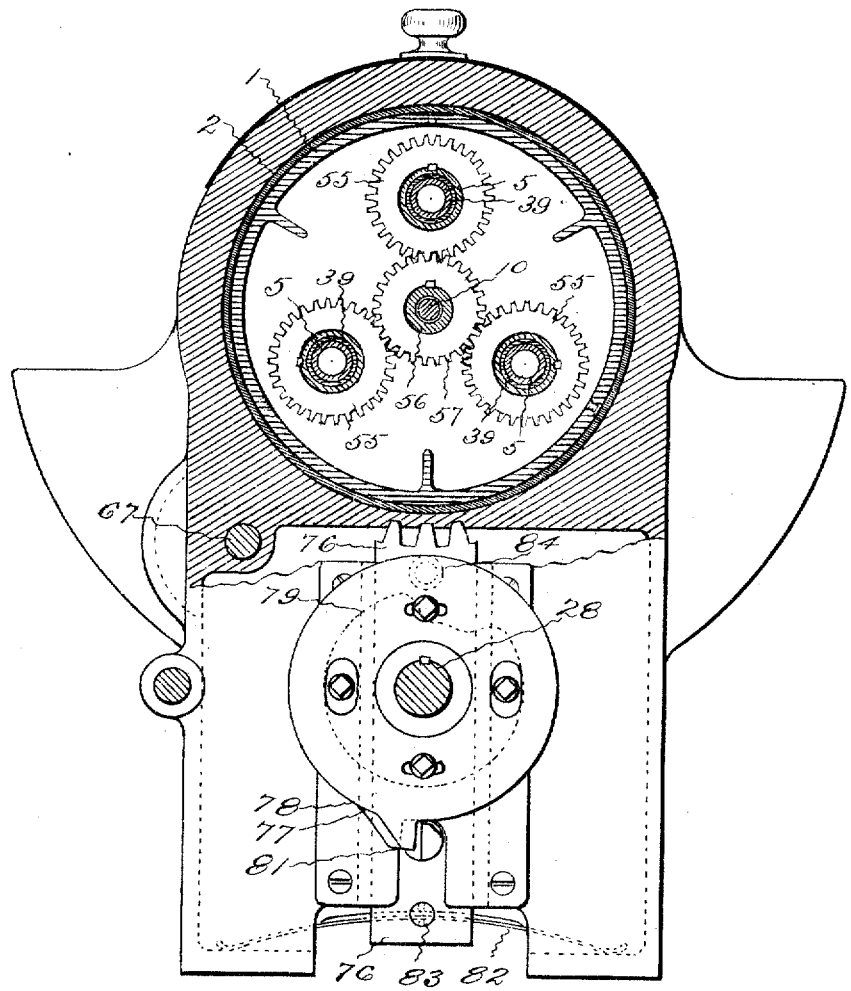

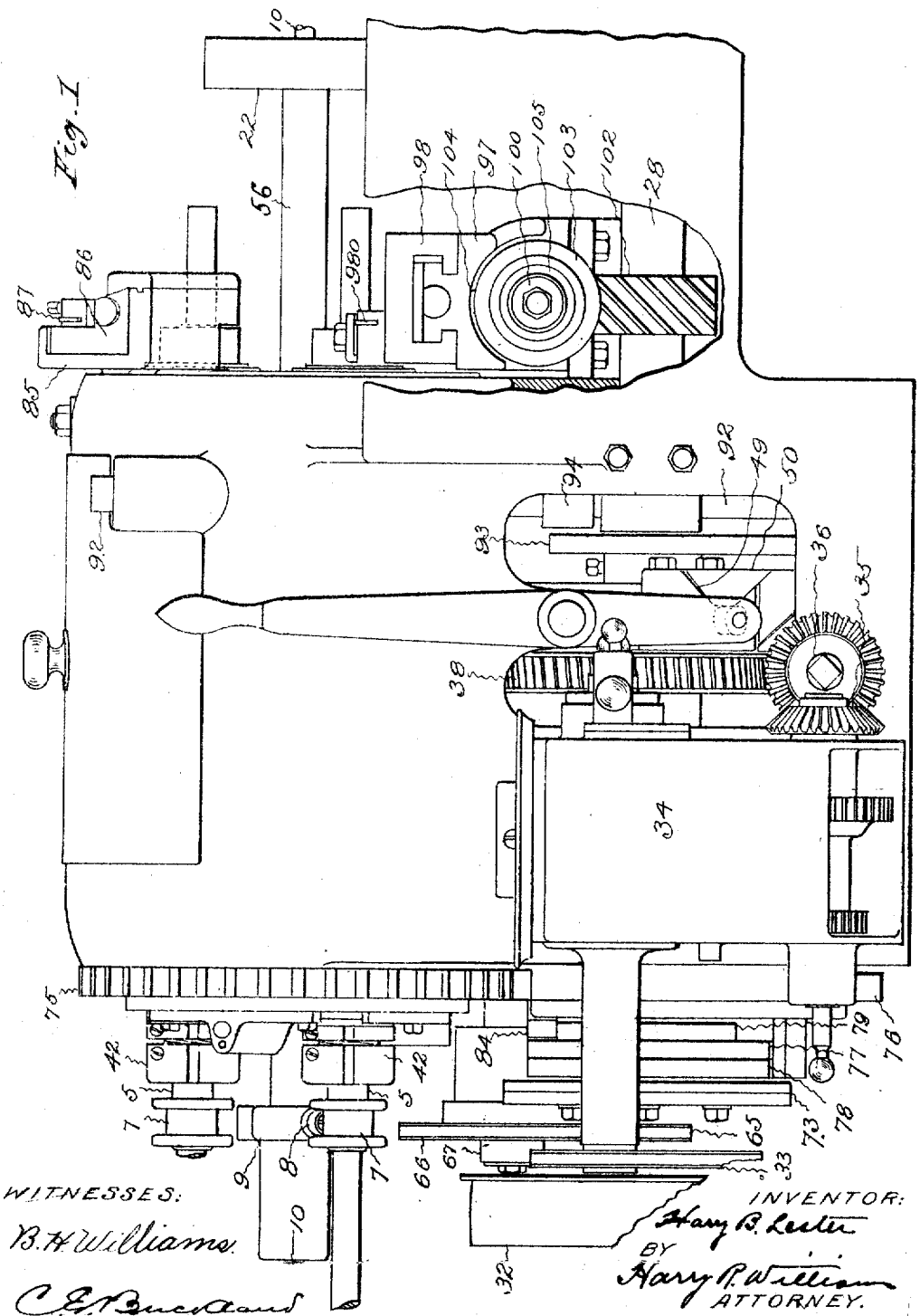

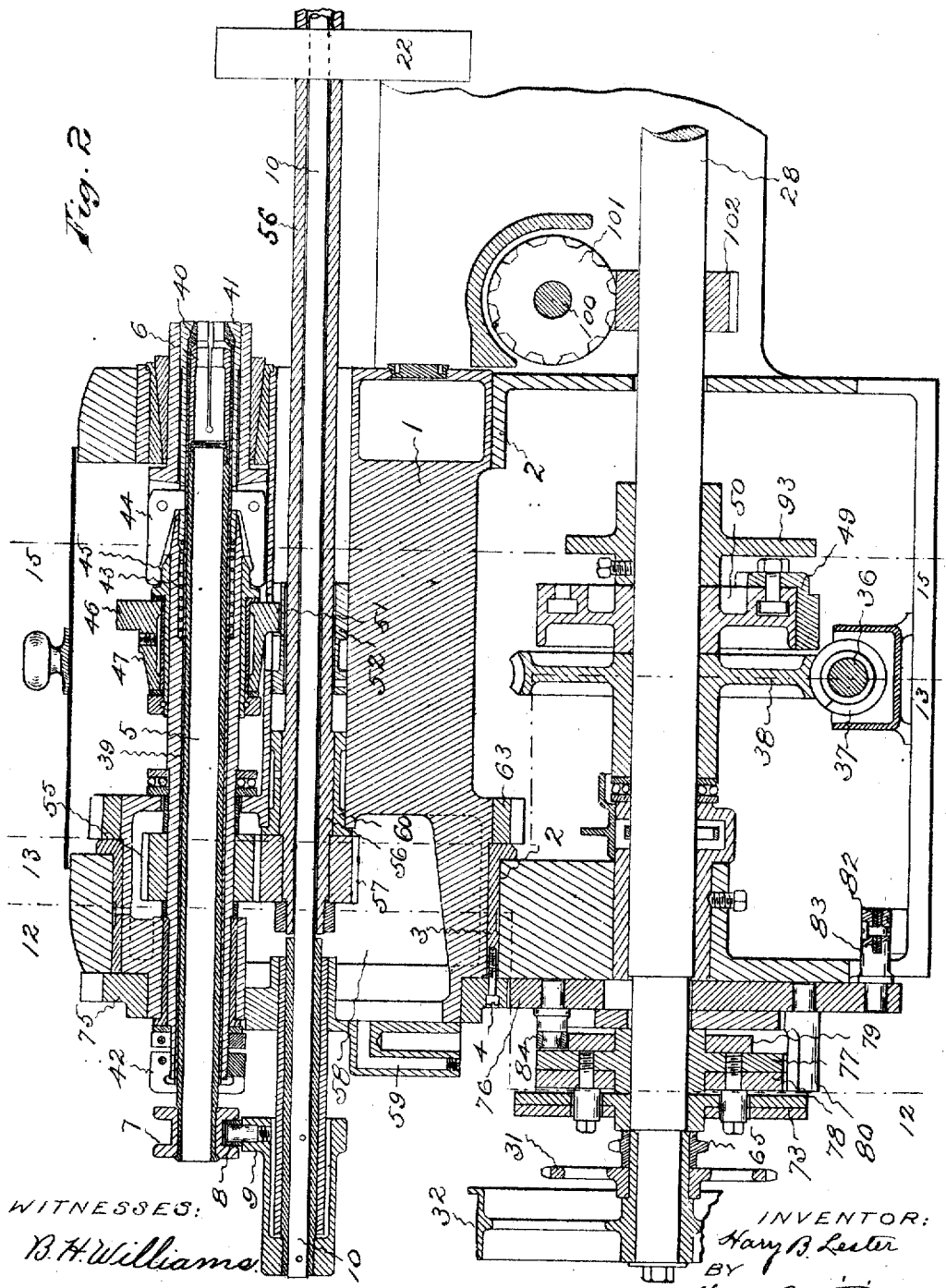

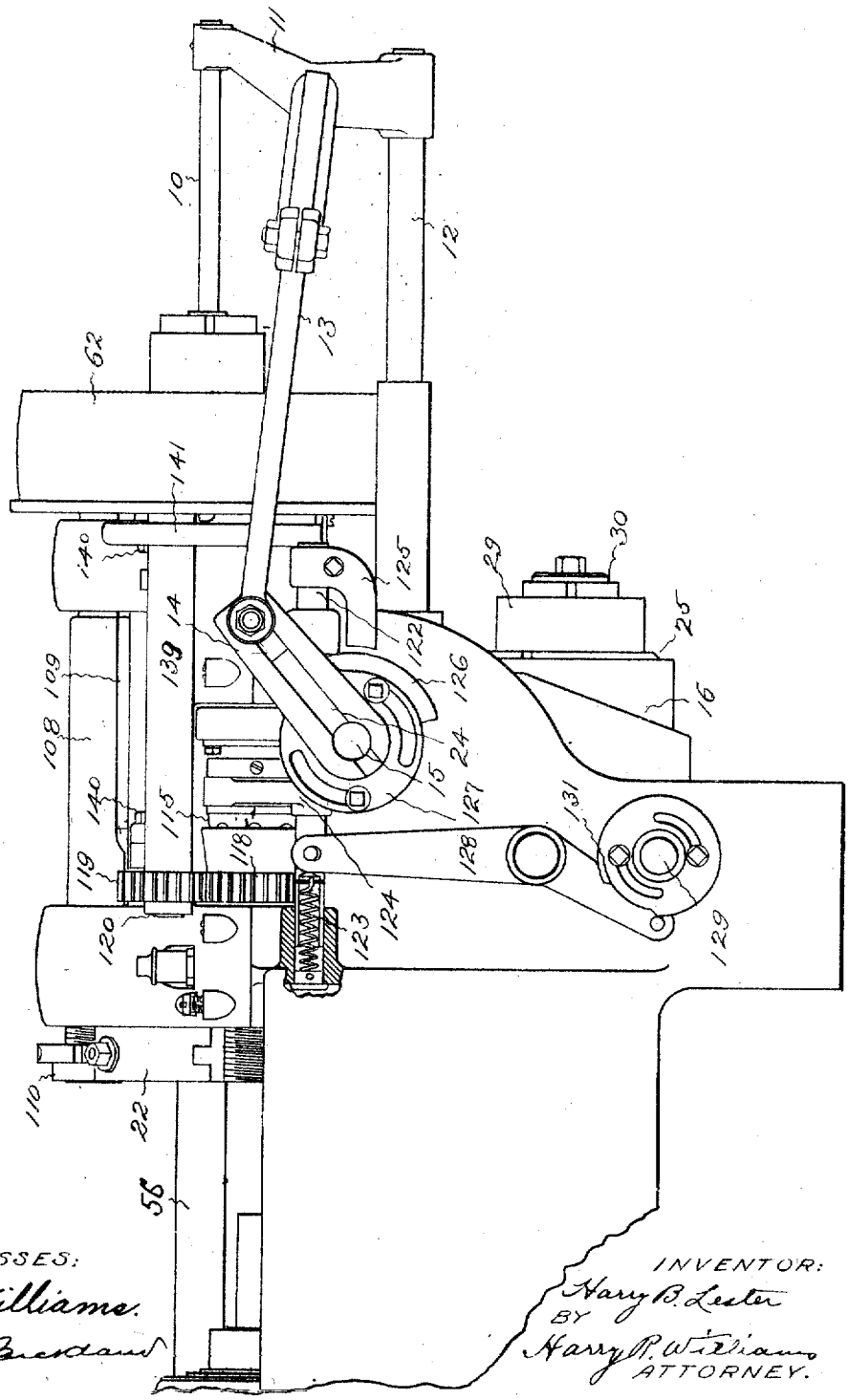

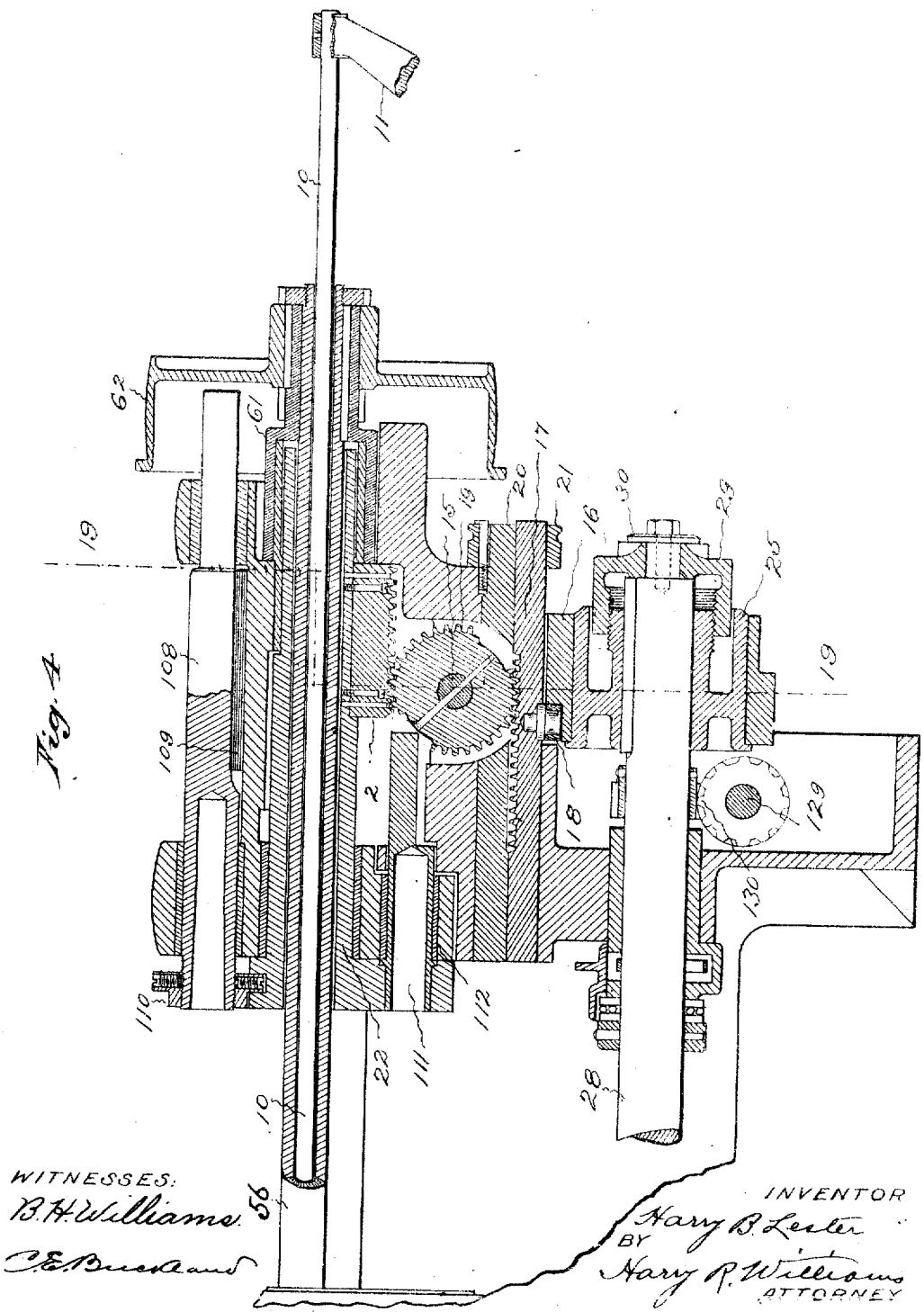

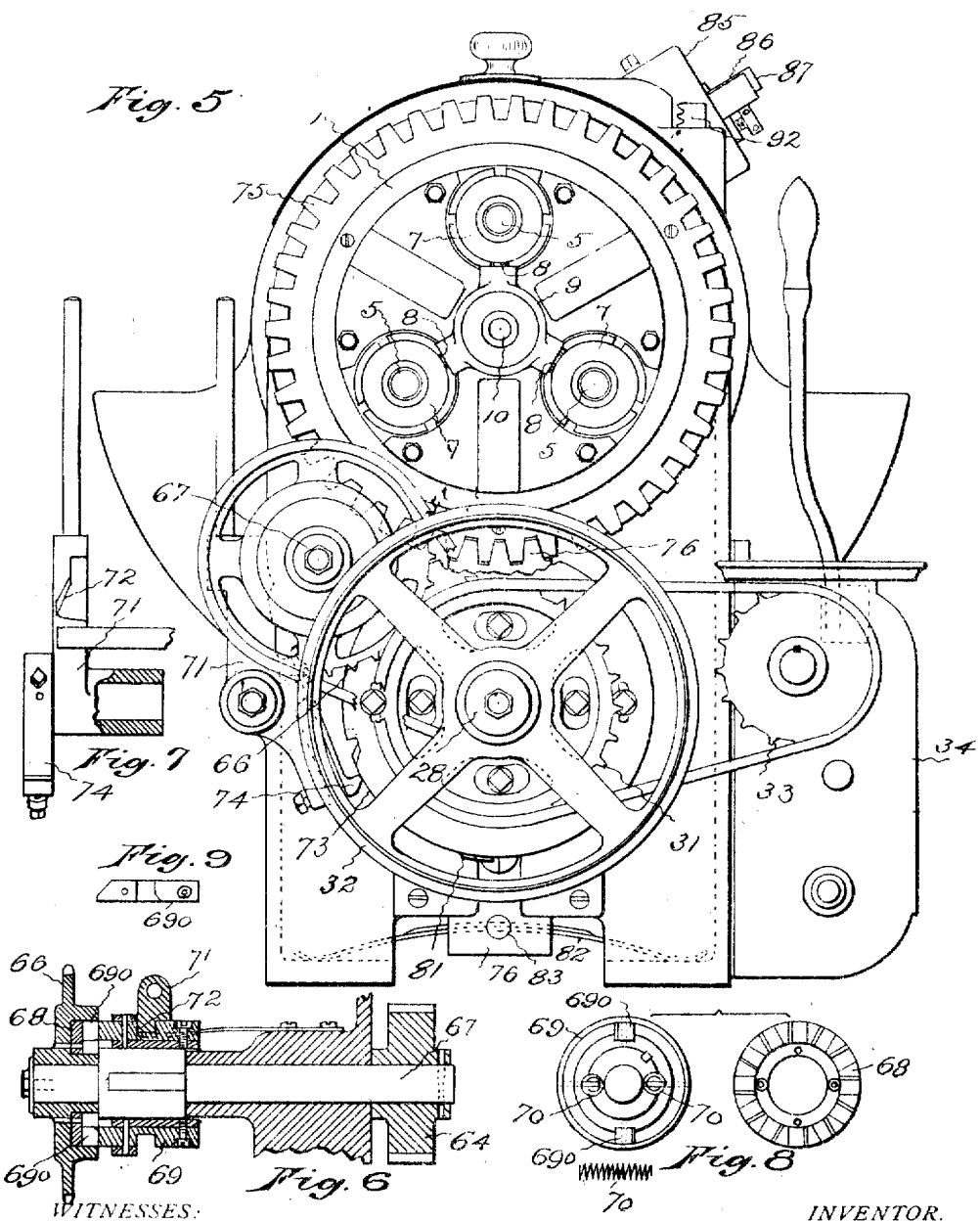

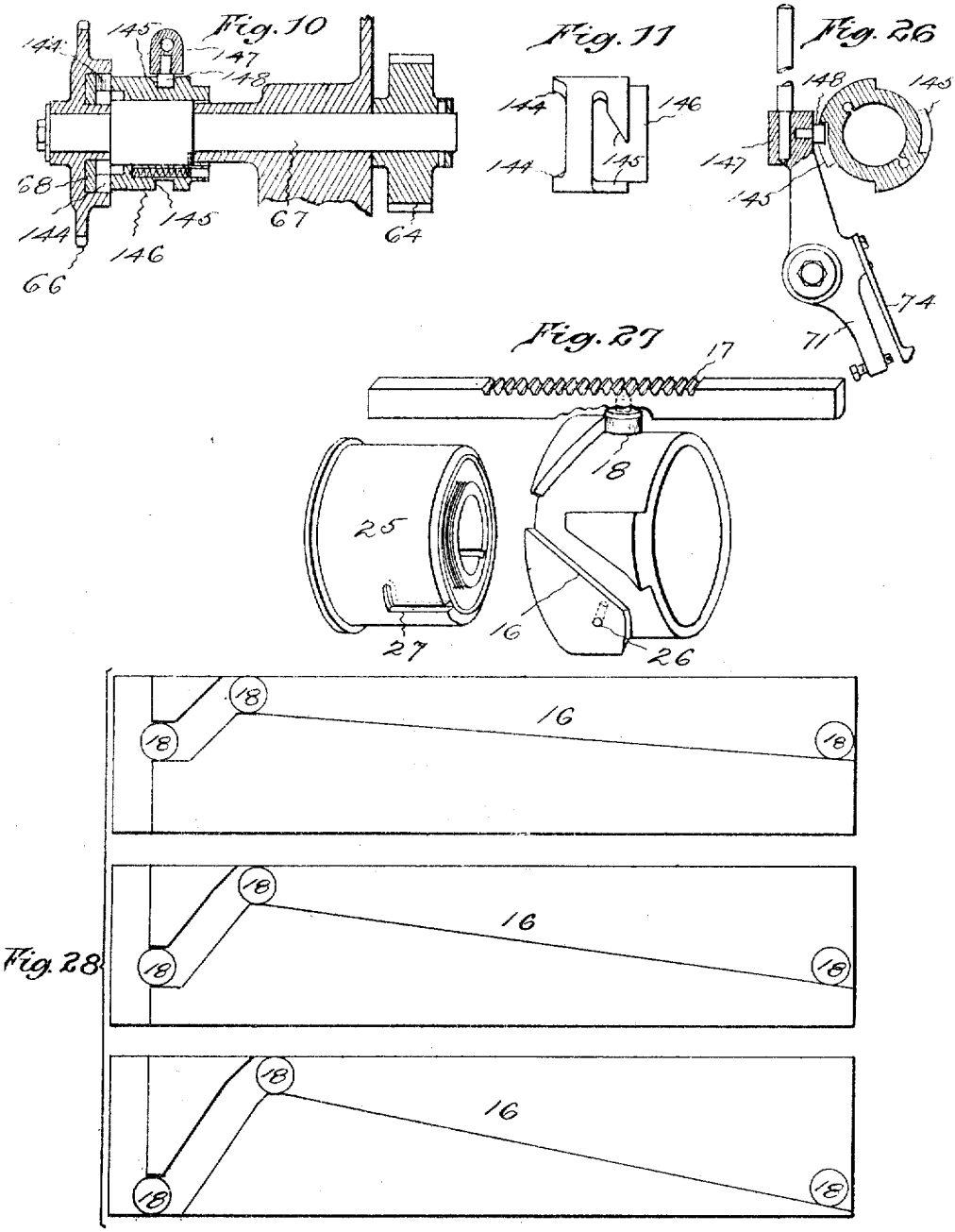

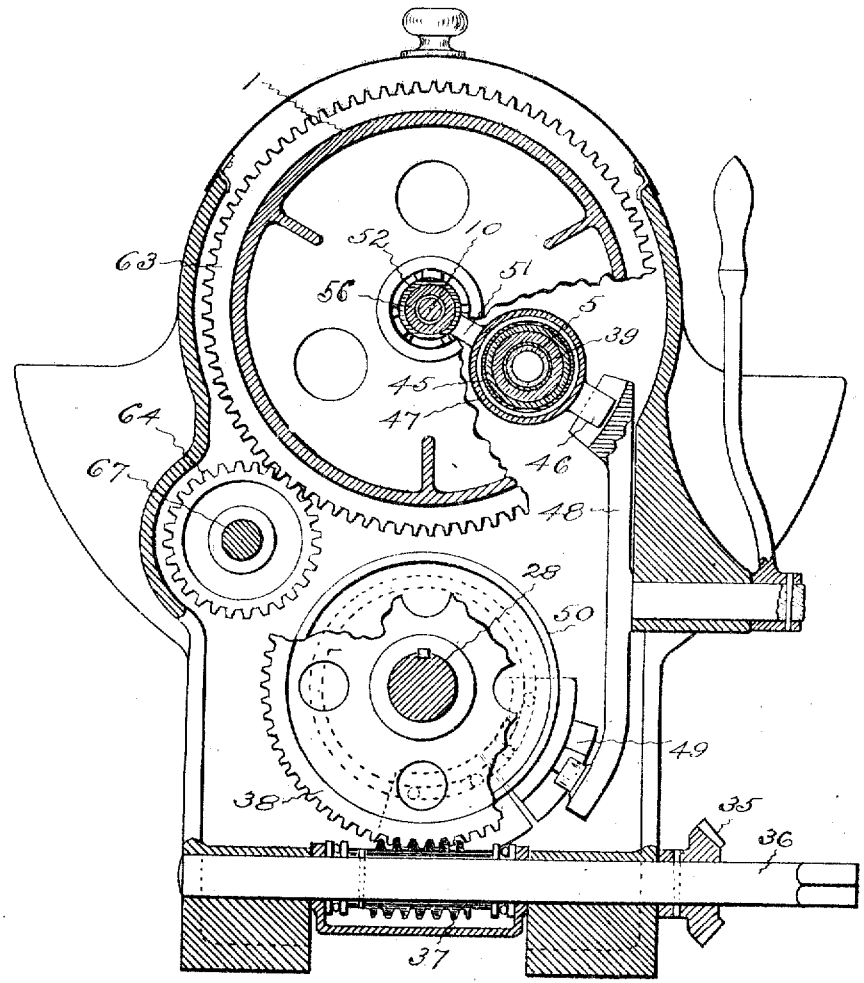

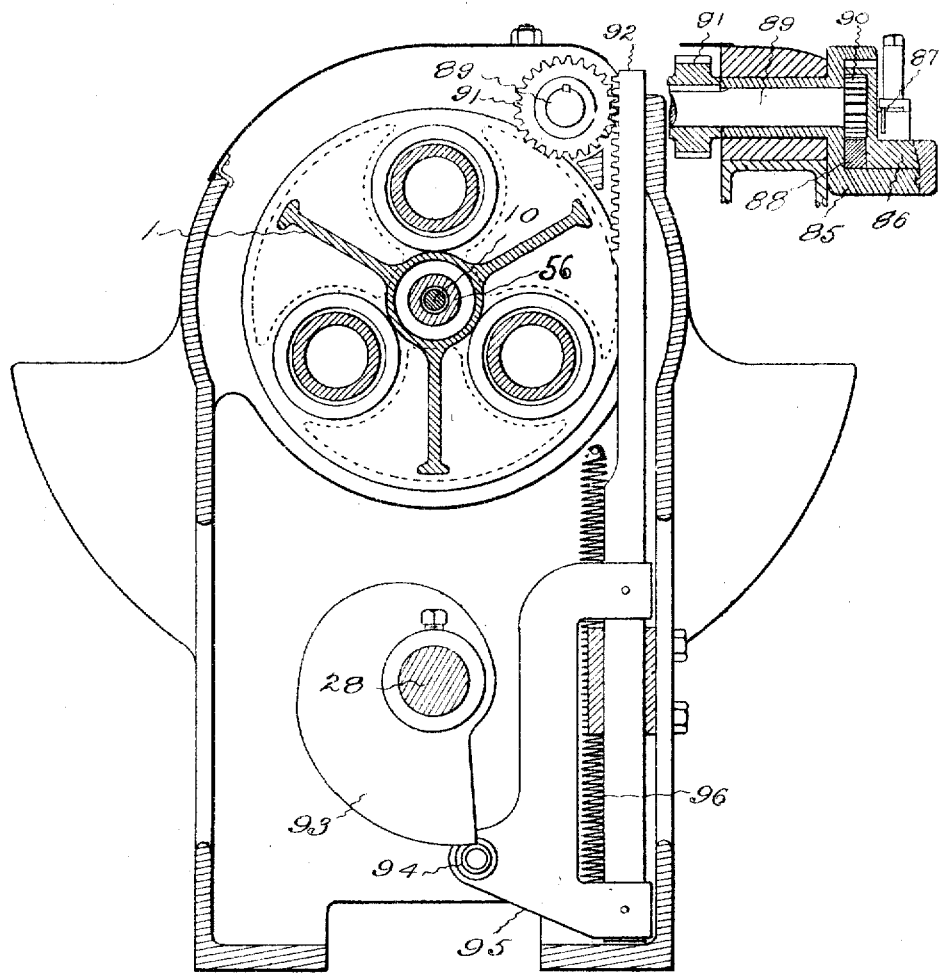

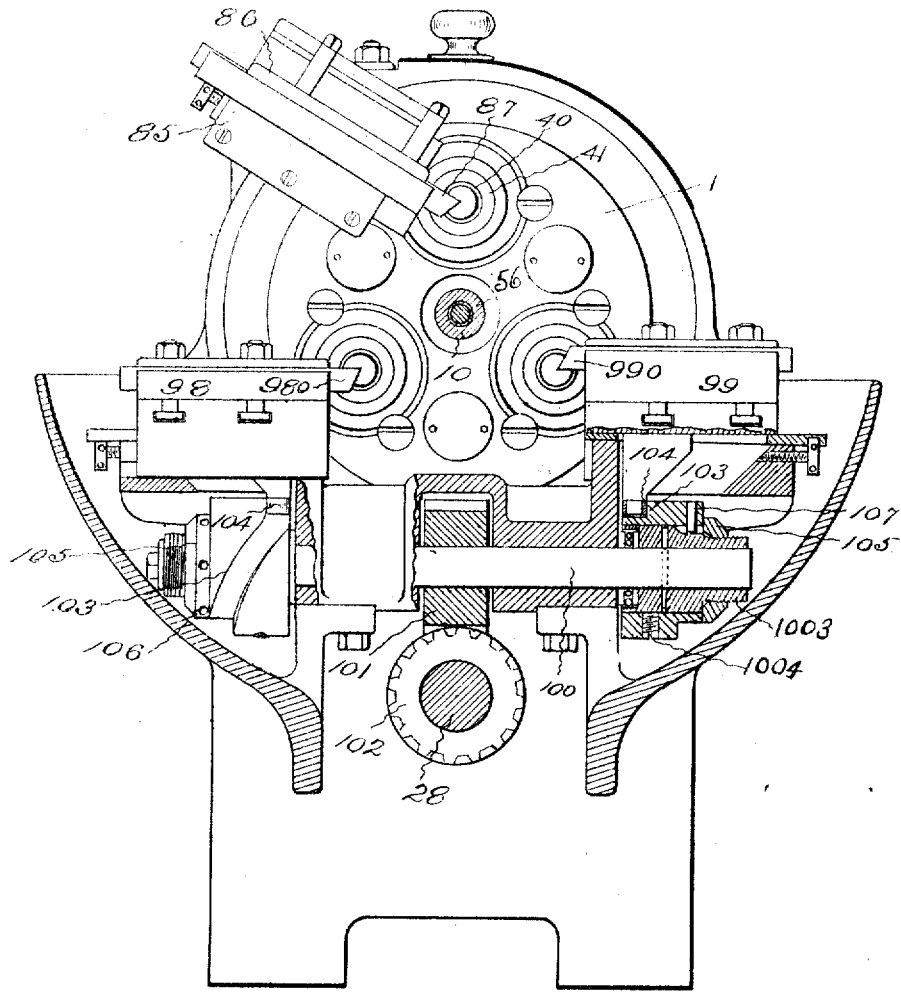

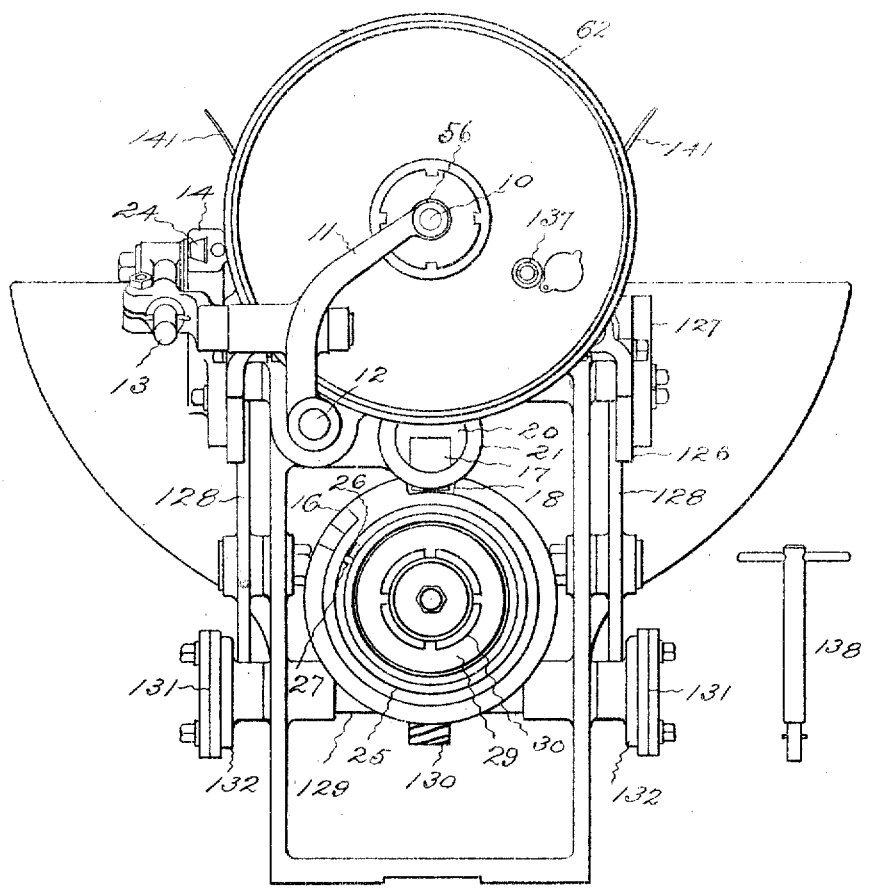

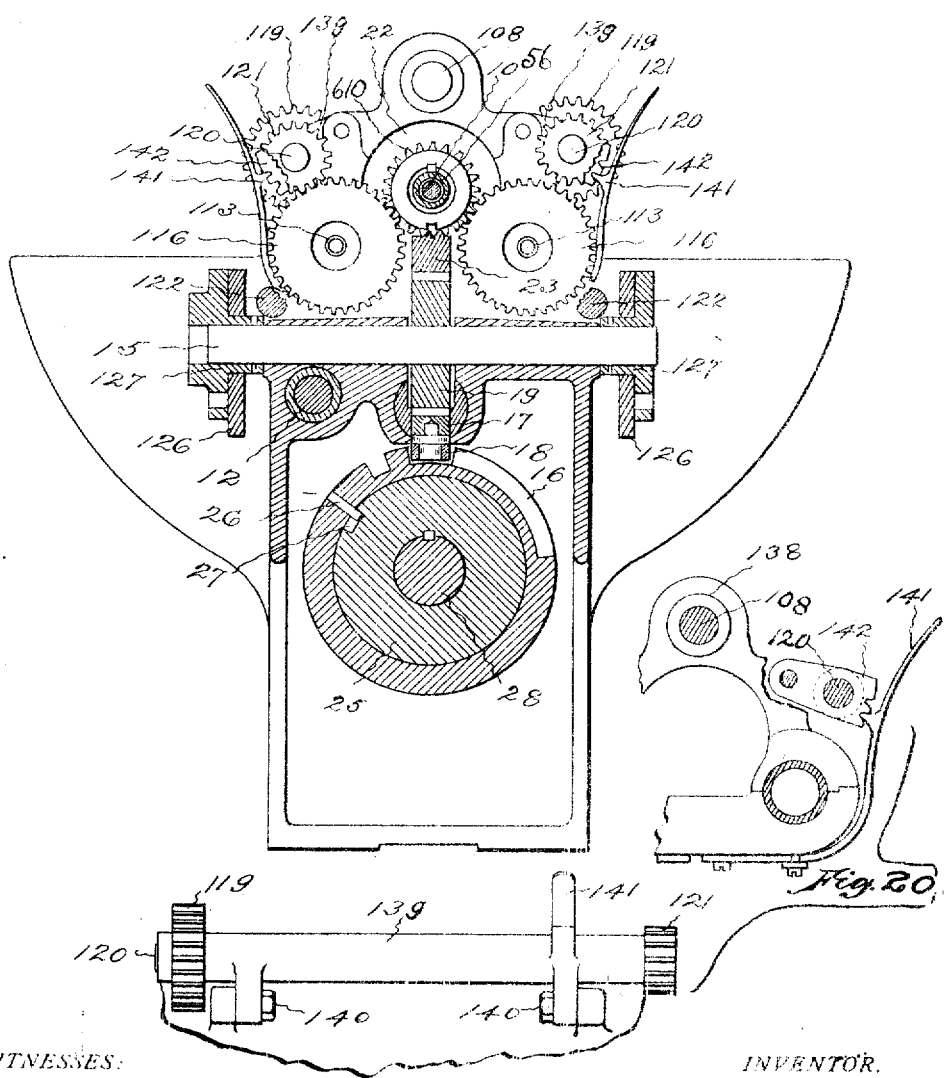

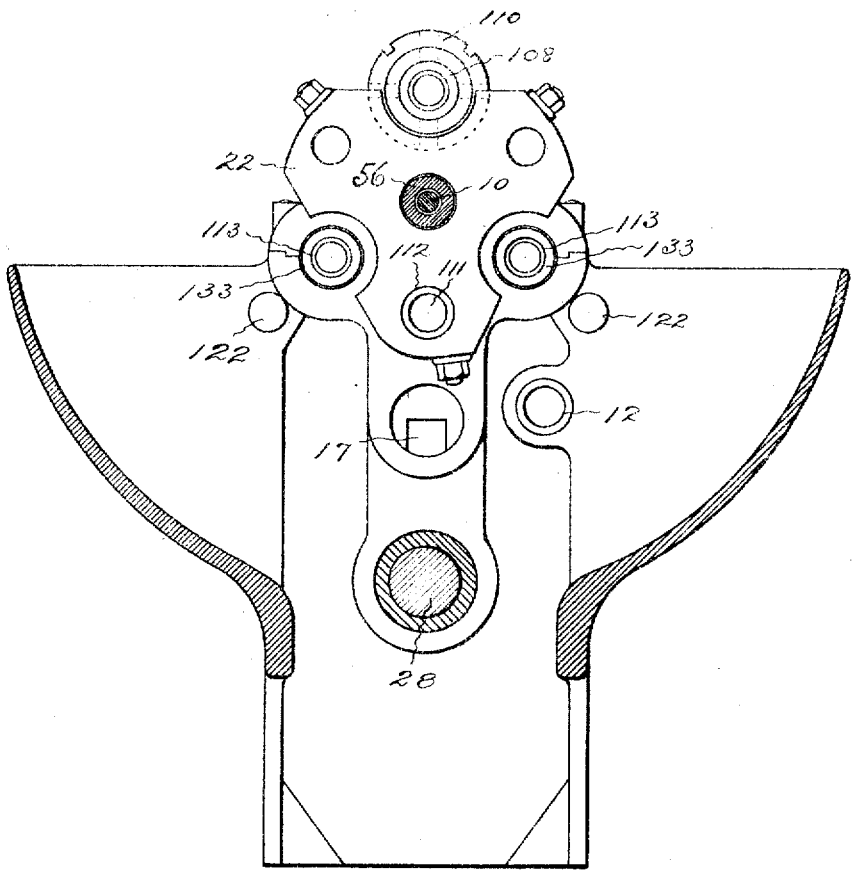

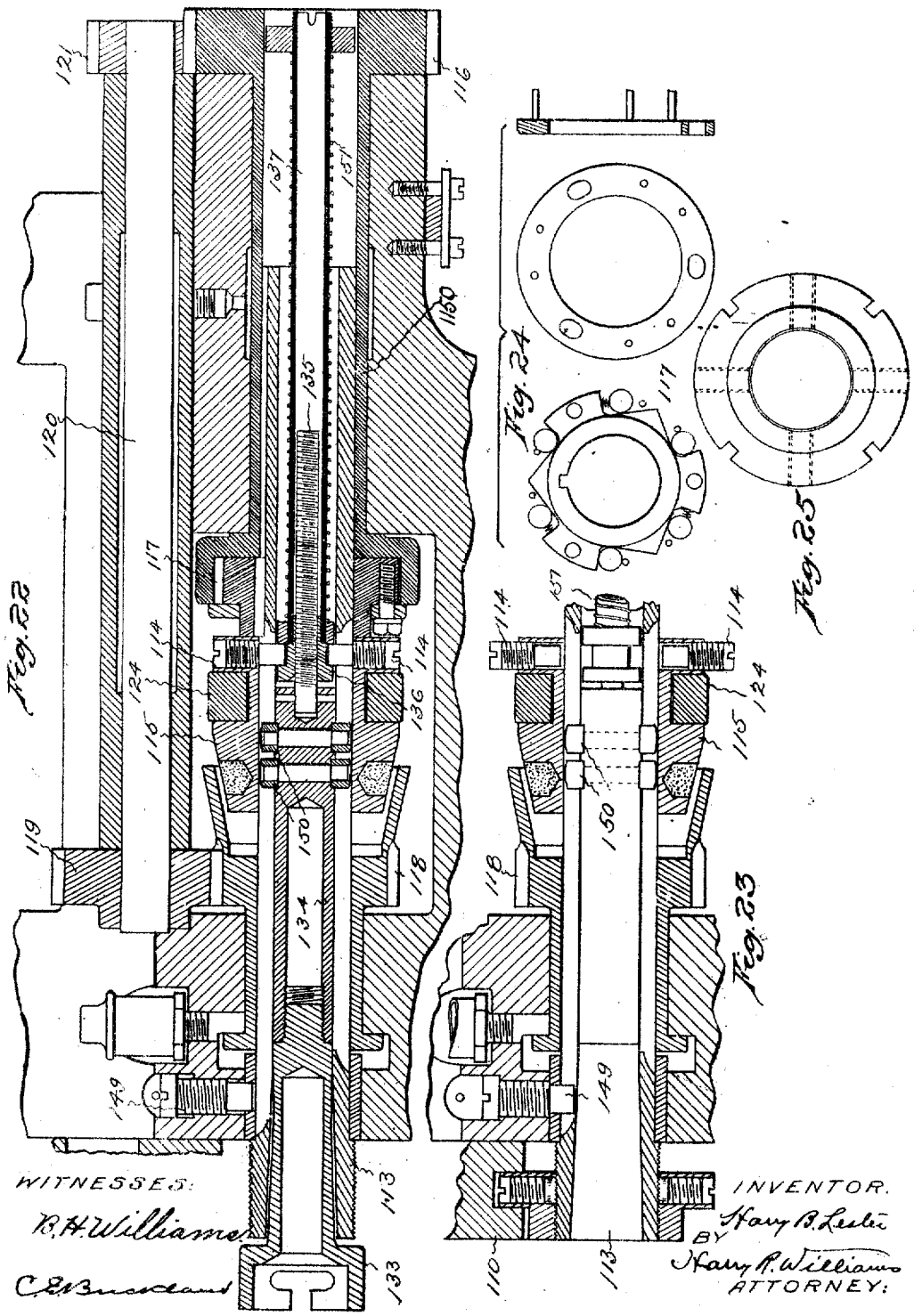

UNITED STATES PATENT OFFICE.

HARRY B. LESTER, OF DAYTON, OHIO, ASSIGNOR TO THE DAVIS SEWING MACHINE COMPANY, OF DAYTON, OHIO, A CORPORATION OF OHIO.

AUTOMATIC SCREW-MACHINE.

No. 916,461.         Specification of Letters Patent.         Patented March 30, 1909.

Application filed September 25, 1907. Serial No. 394,518.

*To all whom it may concern:*

Be it known that I, HARRY B. LESTER, a citizen of the United States, residing at Dayton, in the county of Montgomery and State of Ohio, have invented a new and useful Automatic Screw-Machine, of which the following is a specification.

This invention relates to an automatic screw machine of the multiple, tubular-spindle, rod feed type, with central drive having tubular spindles that are always rotated in the same direction for causing the rods to be operated upon by the tools, and which can be detained in their respective stations and caused to feed the rods collectively to the same or different tools for producing the same or different cuts on the several rods, or, the spindles can be given intermittent revolutionary movements whereby the rods may be presented to a less number, the same number, or a greater number of tools than there are spindles for producing various progressive cuts of the desired character upon the several rods.

The object of the invention is to produce a simple, compact and efficient machine of this character having new and important combinations of elements which give it wide range of action, great certainty in the automatic operation of the parts, close accuracy of the product, complete accessibility to the working mechanism and great facility for adjusting and making changes from one piece of work to another without requiring new tools.

The machine which is illustrated is so designed that three rods of stock may be fed collectively, each to its own tool and no other, which tools may be the same or a different character, and which at each revolution will produce the same cut on each rod, or the machine can be operated so that the several rods held by the several spindles may be successively presented to the same number of or to double the number of different tools for producing different or successive cuts upon each rod, whereby a large number of simple pieces or a smaller number of complicated pieces, that is, pieces having a variety of cuts, can be rapidly produced, on a machine that is comparatively cheap to build, very easy to adjust, and can be operated by an unskilled mechanic accurately and without liability of disturbing the proper adjustment or danger of damage to the essential parts.

Figure 1 of the accompanying drawings shows a side elevation of the spindle head end of the machine with the frame cut away to show an end view of the cross-slide mechanism. Fig. 2 shows a central vertical section of the spindle head end of the machine. Fig. 3 shows a side elevation of the tool head end of the machine. Fig. 4 shows a central vertical section of the tool head end of the machine. Fig. 5 shows an elevation of the left hand end of the machine. Fig. 6 shows a central section of the spindle head rotating pinion and the mechanism for putting it into and out of action. Fig. 7 shows the lever that is acted upon by the cam for starting and stopping the spindle head rotating movement. Fig. 8 shows the ratchet, pawls and spring by which the continuous motion of the driving pulley is intermittently transmitted to the spindle head rotating pinion. Fig. 9 shows a pawl. Fig. 10 shows a central section of a mechanism for producing the intermittent rotation of the spindle head, which is somewhat simpler than that shown in Fig. 6. Fig. 11 shows end and side views of the sliding sleeve with the pawls and cam surfaces formed integral with it. Fig. 12 is a transverse vertical section of the machine on the plane indicated by the dotted line 12—12 on Fig. 2, showing the spindle head indexing bolt and its operating cams, also cutting through the gear chamber and showing the driving gears. Fig. 13 is a similar section on the plane indicated by the dotted line 13—13 on Fig. 2, showing the spindle head rotating pinion and gear, and the chucking lever cam and cam shaft actuating mechanism. Fig. 14 shows the chuck locking sleeve by means of which all the chucks may be made to operate coincidently. Fig. 15 is a vertical transverse section on the plane indicated by the dotted line 15—15 on Fig. 2, showing the means employed to operate the radial tool usually employed for forming or cutting off the rod held by the uppermost spindle. Fig. 16 shows a section of the radial tool holder slide and its immediate operating mechanism. Fig. 17 shows an elevation looking at the right hand end of the spindle head of the machine with all three cutting off or forming tools in operative position. Fig. 18 shows an elevation of the right hand end of the tool head. Fig. 19 is a vertical transverse section of the tool head on the plane indicated by the dotted line 19—19 on Fig. 4, showing the die driving gears and the oscillating shaft gear, and lead cam. Fig. 20 shows top and end views of the die gear mechanism. Fig. 21 shows an elevation of the left hand end of the tool head. Fig. 22 shows a central longitudinal section on larger scale of one of the die spindles and its rotating mechanism. Fig. 23 shows the same die spindle arranged for holding a non-rotating tool. Fig. 24 shows the die spindle threading clutch. Fig. 25 is a view of the tool spindle connecting collar. Fig. 26 shows another view of the lever that is acted upon by the cam for starting and stopping the spindle head rotating movement. Fig. 27 is a perspective view of the tool head reciprocating rack and a removable cam and its hub, that are employed to reciprocate the rack. Fig. 28 shows developments of the cams used to give different lengths of feed to the tool head and feed tube.

In the machine illustrated there are three rod spindles with rod feeds and chucks and there are three transversely movable cutting tools and means for using six axially movable tools, two of the latter being shown as threading tools. It is to be understood however, that the invention is not limited to the exact number of spindles shown and also that the number of tools may be increased or diminished according to the number of spindles.

The spindle head 1 is rotatably supported at its ends by bearings 2 in the frame. Encircling the spindle head and forming the wearing surface at the left hand end is a sleeve 3 that is drawn to place by screws 4, whereby all end motion of the spindle head resulting from wear can be taken up. Fig. 2.

In each spindle, of which three are shown, is a feed tube 5 with a split gripping collet 6 at one end and a grooved collar 7 at the other end. The feed tubes are moved back and forth at the proper time by the engagement with the grooved collars of either one or three of the rolls 8, which are fastened to the roll disk 9 according to whether the tubes are to be reciprocated singly in succession or simultaneously. This disk is fastened to a reciprocating shaft 10 that extends through the center of the spindle head and also through the center of the tool head to the right hand end of the machine where it is connected with an arm 11 supported by a pilot shaft 12. Figs. 1, 2, 3, 4. A rod 13 adjustably attached to the arm 11 connects that arm with a rocker arm 14 that is attached to an oscillating shaft 15, which shaft is actuated by the lead cam 16 through the medium of a rack 17 with its cam roll 18 and an oscillating gear 19 fastened to the rocker shaft. The rack 17 is guided by the casting 20, at the end of which is a collar 21 that supports the end of the rack, and which when taken off permits the removal of the rack. Figs. 3, 4.

The hub of the tool head 22 has a rack 23 that is also engaged by the oscillating gear 19, and consequently receives its motion from the lead cam. Fig. 4. The tool head is shown as arranged for receiving the shanks of three tools and for carrying with it one or three spindles. Fig. 21. When the tool head is pushed forwardly by the lead cam and racks and pinion, the feed tubes are drawn backwardly, which movement of the feed tubes can be made as long or as short with relation to the movement of the tool head as necessary to produce a screw of the desired length, by adjusting the sliding trunnion of the connecting rod along the groove 24 of the rocker arm. Figs. 3, 4. When the tool head is drawn back after the end tools have performed their work, the feed tubes are drawn forwardly advancing the rods and exposing a definite length for the next cut without the necessity of stopping to gage the length of the exposed ends. Whether this back and forth motion is communicated to one or all of the feed tubes depends upon whether one or three rolls are placed on the roll disk 9. Figs. 1, 2, 3, 4.

The lead cam 16 is fastened to the cylindrical hub 25 by a bayonet joint formed by a pin 26 sliding in a groove 27. Figs. 4, 19, 27.

To change the amount of the forward movement of the tool head, the cam is turned backward slightly to release the bayonet joint and slide off the hub, then another cam having the necessary pitch is substituted and fastened by simply turning, without the use of any tools. This construction provides means which can be manipulated by any one very quickly for giving the tool head and the feed tubes the necessary traverse for long or short screws with short or long threads. To accomplish the fine adjustment so necessary for bringing the tool head to exact position, the hub 25 carrying the cam is moved longitudinally on the cam shaft 28 to which it is splined, by means of a nut 29 that is threaded on the hub and turns freely, but is held against longitudinal movement on the shaft by a shoulder and the washer 30. Fig. 4.

A sprocket wheel 31 attached to the hub of the driving pulley 32 that is loose on the left hand end of the cam shaft, through the medium of a chain, drives a sprocket wheel 33 that is connected with the gears of a speed box 34, through which a greater or less speed is imparted to a pair of bevel gears 35, one of which revolves a shaft 36 having a worm 37 that meshes with a worm wheel 38 keyed to the cam shaft 28, which makes one full revolution during each cycle of the machine. Figs. 1, 2, 5, 13.

Inside of each spindle but outside of the feed tube is a chuck tube 39, at the forward end of which is a spring jaw chuck 40. The position of the chuck with relation to the chuck closing sleeve 41 is determined by the adjustment of the nut 42 threaded upon the rear end of the spindle. Fig. 2. The chuck closing sleeve is normally thrust forward by a spring 43 and is drawn backward for closing the chuck jaws by levers 44 that are pivoted in an enlarged part of the spindle and are spread by the conical wedge 45. The wedge is moved backwardly and forwardly at the proper time by the engagement of a lug 46 projecting from the collar 47 on the wedge sleeve, with an end of a lever 48 that is pivoted to the frame and that is oscillated by cams 49 adjustably fastened to the drum 50 which is keyed to the cam shaft. Figs. 2, 13.

If the roll disk 9 has but one roll attached, so as to move the feed tubes one at a time, it will be the roll pointing toward the lever 48, and as each spindle reaches this station, during its revolution with the spindle head, its chuck is opened and closed, but if three rolls are attached to the roll disk so as to move all of the feed tubes simultaneously, then all the chucks will be opened and closed at once.

The inner edge 51 of each chuck wedge collar 47 extends into a groove in a sleeve 52 that has annular and longitudinal grooves, and lies in the center of the spindle head encircling the central shaft, but not attached thereto. When the feed tubes are to be moved singly, and the chucks opened and closed one at a time, the sleeve 52 is held by the screw 53 (Fig. 14) so that the edge 51 of the chuck wedge collar moves back and forth in a longitudinal groove and does not cause the sleeve to impart motion from one chuck wedge collar to another, but when all the feed tubes are to be moved simultaneously the sleeve is turned until the radial walls of the groove 54 of the sleeve will embrace the inner edges of all the chuck wedge collars and compel them to move in unison and open and close all of the chucks co-incidently. Figs. 2, 13, 14.

Keyed to each spindle is a pinion 55 and extending through the center of the spindle head is a tubular drive shaft 56 carrying a drive pinion 57 which engages all the spindle pinions. Fig. 12. The head is so constructed as to form an oil tight compartment 58, in which these pinions run, and this compartment is designed to be filled with oil through the duct 59, when it is in an upright position. The tubular drive shaft throughout its length envelops the reciprocating feed rod without interfering with its action. It is journaled in a bushing 60 in the spindle head and extends through the center of the tool head to the right hand end, where it is fixedly supported by a sleeve 61 which carries a driving pulley 62. Figs. 2, 4. The rotation of this driving pulley causes the continuous uniform rotation of the spindles regardless of their position about the axis of the head.

Encircling the spindle head and fastened thereto in the oil chamber is an annular gear 63 which is in mesh with the pinion 64. Figs. 2, 13. This gear and pinion are so proportioned that one-half revolution of the pinion will revolve the gear, and consequently the spindle head, one-sixth of a revolution, while a full revolution of the pinion will advance the head one-third of a revolution.

Keyed to the hub of the driving pulley 32 on the cam shaft 28 next to the sprocket wheel 31 is a sprocket wheel 65. This sprocket wheel drives a chain that passes around a sprocket wheel 66 that turns on the shaft 67 which carries the spindle rotating pinion 64. Figs. 5, 6.

Within and attached to the hub of the sprocket wheel 66 is a ratchet plate 68 and encircling an enlarged part of the shaft 67 and adapted to slide thereon, but compelled to rotate therewith is a block 69. This block carries pawl bolts 690 shaped to engage the notches of the ratchet 68 toward which they are normally thrust by springs 70. Figs. 6, 8, 9. Arranged to prevent the engagement of the pawls with the ratchet except at the proper time, is a lever 71 which normally is in such position that the cam surface 72 forces the block carrying the pawls back against the pressure of the springs. Figs. 6, 7, 26. Mounted upon the cam shaft near the driving pulley and rotating therewith is a cam 73 composed of two disks which are held together by bolts and have a concentric adjustment with relation to each other. Figs. 2, 5. The outer edge of each cam disk presses against a stiff spring arm 74 attached to the lever 71 and compels the cam surface 72 to hold the pawls back out of engagement. At one place in the outer edge of each cam disk a depression is cut and at the proper time the spring arm drops into this depression thereby releasing the block 29 allowing the springs to thrust the pawls into the ratchet. This causes the shaft 67 to rotate with the constantly rotating sprocket wheel and gives the spindle head a partial revolution. To have the spindle head move one-sixth of a revolution, the cam disks 73 are adjusted so the depression is so short that just before the pinion makes one-half of a revolution, the spring arm is forced to the outer edge of the disks compelling the lever 71 to return to its normal position where the cam surface 72 engages with the pawls and pulls them out of engagement with the ratchet. To have the spindle head move one-third of a revolution the cam disks are adjusted so as to lengthen the depression and hold the lever out of its normal position until just before the pinion has made one full revolution. Figs. 2, 5, 6, 7, 8, 9. A modification of this construction is shown in Figs. 10, 11, and 26 where the pawls 144 and cam surfaces 145 are integral with the sliding block 146, and the lever 147 has but a simple pin 148 for engaging the cam surfaces. This is the preferred construction as it has the advantage of fewer parts. By this mechanism the spindle head can be rotated so as to stop at six or three stations and present the rods to either six or only three tools.

Fastened about the spindle head is an indexing ring 75 with teeth on its periphery. This ring is in the form of an annular rack and it may have its teeth cut by an ordinary gear cutter. Sliding vertically on the end of the spindle head frame is an index bolt 76 that has its upper end provided with teeth shaped to fit closely in three of the spaces between the teeth of the annular index rack and hold the spindle head rigidly during the cutting action of the tools. Figs. 2, 5, 12.

Keyed to the cam shaft and revolving therewith is a three part cam consisting of an intermediate disk 77 and two outside disks 78 and 79, fastened together by bolts, which when loosened allow concentric adjustment of the disks with relation to each other. Figs. 2, 12.

Attached to the index bolt 76 is a stud 80 which is engaged by the projections 81 on the two cam disks 77 and 78 (Fig. 12) whereby at the proper time the bolt is withdrawn from engagement with the indexing rack and the spindle head left free to be revolved. The outer cam surface formed by the projections 81 is made longer or shorter by the adjustment of the cam disks 77 and 78 with relation to each other, for the purpose of keeping the index bolt out of contact with the indexing rack a longer or shorter time corresponding to the setting of the revolving mechanisms for turning the spindle head one-third or one-sixth of a revolution.

Upon the completion of the periodic rotatory movement of the spindle head the stud 80 disengages from the projections of the cam disks and the spring 82 attached to the index bolt by the stud 83, and pressing on the frame, lifts the index bolt into contact with the indexing rack, engaging the teeth that are presented by the last rotatory movement of the spindle head. Figs. 2, 12. To make this contact positive and secure the cam disk 79 passes under the roll 84 mounted on the index bolt and prevents any loosening of the bolt until the tools have ceased to act upon the rods, and a new presentation is to be made. Figs. 2, 5, 12.

On the face of the frame is a radial tool box 85 the hub of which is fastened in an opening in the frame, Figs. 1, 16, 17.

In the box is a holder 86 that is arranged to be moved radially toward and from the adjacent spindle. The tool holder carries a cutting tool 87 of the desired form. Attached to the tool holder is a rack 88 and extending through the hub of the tool box is a shaft 89 with a pinion 90, keyed thereto and engaging with the rack. Fig. 16. Splined upon the shaft is a pinion 91 that engages teeth on the upper end of a vertical rack 92. Fig. 15.

Adjustably attached to the cam shaft is a cam 93 which engages a roller 94 mounted on a yoke 95 which is fastened to the upright rack. A spring 96 tends to lift the upright rack and cause it to rotate the pinions in such manner as to withdraw the cutting tool quickly from its work. At the proper time the cam draws the rack downwardly and causes it to rotate the pinions so as to feed the tools slowly and evenly toward the work. Figs. 2, 15.

Below the radial tool holder on a cross slide frame 97 is a front tool holder 98 and a rear tool holder 99, each of which holders carries a cutting tool 980, 990. Fig. 17. Rotating in the body of the slide frame is a shaft 100 actuated by a spiral gear 101 that meshes with a spiral gear 102 fastened on the cam shaft. Figs. 1, 2, 17.

On the ends of the transverse slide shaft and adjustably fastened to hubs 1003 thereon by screws 1004 are cams 103 which act upon rolls 104 suspended from the tool holders and give the necessary forward and backward movements to the cutting tool holders. A portion of each cam carrying hub is threaded to receive an adjusting nut 105 whereby fine adjustment to give the exact amount of advance of the tools can be made without disturbing the clamping bolts which hold the tools in the holders. Furthermore holes 106 are cut in the cam hubs so that the relative positions of the cam surfaces may be changed with relation to the revolutions of the shafts by slipping the pin 107 in one or the other of the holes. Fig. 17.

Mounted upon the tool head frame in alinement with the upper spindle station is a tool spindle 108 that is adapted to move in the direction of its length but is prevented from revolution by the plate 109 against which it bears. Fig. 4.

The forward end of the tool spindle is threaded to receive a flanged nut 110 that is adapted to fit loosely in a groove cut in the body of the tool head whereby the tool spindle is drawn forward and pushed back by the reciprocating movement of the head. Figs. 3, 4.

When there is but one roll on the roll disk and the feed tubes are being operated one at a time, it will be the one toward the chucking lever and on the front side of the machine. Directly after chucking the time arrives for the periodic rotatory movement of the spindle head which brings a new rod directly opposite the tool spindle and ready for the roughing cut. As the tool head advances drawing the tool spindle with it, all the strains of the roughing cut are resisted by the tool spindle alone and are not communicated to the other tools carried by the head which are simultaneously performing the more accurate finishing cuts on the ends of the other rods. A pin 111 sliding in the bushing 112 prevents any rotatory movement of the tool head as it advances and withdraws the tools. Fig. 4.

Rotating in the tool head frame in longitudinal alinement with the two side rod spindles are two threading spindles 113. These spindles may carry taps or dies, or one may carry a tap and the other a die, according to the work which it is desired to accomplish. Figs. 21, 22. Sliding on each threading spindle, but rotatably fastened thereto by screws 114 is a friction clutch hub 115. Loose on the spindle is the long hub 115g of a pinion 116. This pinion and its hub has no longitudinal movement, being held by the frame, and it communicates its movement to the spindle in one direction through a roller clutch 117 of common form that has its male part keyed on the spindle so as to engage with the female part in the interior wall of the hub of the pinion. Figs. 22, 24. In front of the friction clutch hub is a corresponding friction cup formed in a part of a loosely running gear 118 that is held by the frame and surrounds the spindle. Meshing with this gear is a pinion 119 mounted upon a shaft 120 which extends back to a pinion 121 that meshes with the spindle rotating pinion 116. Fig. 22. The supporting sleeve 61, carrying the driving pulley 62 and tubular driving shaft 56, has teeth 610 cut in its surface which mesh with the teeth of the pinion 116. Figs. 4, 19.

Held by the tool head frame parallel with each threading spindle is a non-rotating sliding shaft 122 that is drawn forwardly by a spring 123. Mounted upon each sliding shaft is a forked arm 124 which fits a groove in the friction clutch hub 115 and effects its longitudinal movement. On each sliding shaft there is also a finger 125, the forward end of which is held against the peripheral surface of a disk 126 that is adjustably attached to a hub 127 which is fastened to the oscillating pinion shaft 15. Figs. 3, 19. A lever 128 pivoted on each side of the frame of the tool head engages a stud on the adjacent slide shaft 122. A transversely extending shaft 129 revolved by spiral gears 130 controls the movement of these levers through the medium of the cam disks 131 attached by bolts to hubs 132 fastened to the shaft. Figs. 3, 4, 18.

The die collet 133 provided with a die is set forward to approach the work to be threaded by adjusting the follower 134 through the medium of the threaded rod 135 and the nut 136 which is connected with the tube 137 that may be turned by a key 138 applied at the right hand end. Figs. 18, 22. When the proper time for threading comes the cam disk 131 allows the lever 128 to drop and the spring 123 to press the die against the work and start the cutting, after which the tool follows the thread it cuts. At this time the finger 125 engages the cam disk 126 and prevents further movement of the friction clutch hub until the required length of thread is cut, then the finger 125 drops off the cam surface and allows the friction clutch parts to be thrown together by the spring, which causes the spindle to be given a faster rotation. This motion imparted through the friction clutch being faster than the speed of the rod spindle causes the die to be unscrewed from the rods. As soon as the die has unscrewed from the thread it has cut; the spring 151 encircling the adjusting tube 137 draws the die away from the rod.

When the friction clutch parts are engaged the threading tool spindles are rotated faster than the rod spindles so that the tools will be unscrewed from the rods, but at all other times the threading tool spindles are rotated slower than the rods so that threads will be cut thereon. The roller clutch between the driving pinion and the threading tool spindle permits the increase of speed automatically.

To permit the disengagement of the high speed gearing when the threading spindles are not to be used for threading, the bearing boxes 139 for the shafts 120 are pivoted to the frame by bolts 140 so that they can be turned and the pinions lifted out of mesh and thus held by the springs 141, which likewise must be made to retain the boxes with the gears in mesh when lowered to the proper notch of the latches 142. Fig. 20.

Under circumstances calling for one or both of the threading tool spindles to be used as box or other tool holders, a nut 110, similar to the nut on the upper tool holder, is screwed on to the threaded portion of the threading tool spindle. This nut has a flange that fits the groove in the end of the tool head so the spindle will be carried back and forth with the tool head as previously described. A screw 149 is turned down into the groove provided for the die follower rolls 150 to prevent rotary movement of the spindle, and the withdrawal of the screws 114 in the friction clutch hub releases the die feeding mechanism. Fig. 23.

In the machine illustrated three rods of stock can be intermittently fed to the tools. When the feeding and chucking mechanisms are adjusted in one manner the three rods of stock will be unclasped, fed forward and clamped simultaneously, so that each rod will be acted upon by its own tool and these tools may be similar or dissimilar in character. If the chucking and feed mechanisms are adjusted in the other manner, the three rods of stock are released, fed and clamped successively, so that each rod can be presented progressively to all of the tools which are required to produce the desired cuts.

If the spindle head rotating and indexing mechanisms are in one adjustment, the spindle head is moved one-sixth of a revolution each time the index bolt is withdrawn so that the stock held by the spindles may be presented to six end tools. If the spindle head rotating and indexing mechanisms are in another adjustment, the spindle head is moved one-third of a revolution each time the index bolt is withdrawn, and thus presents each piece of stock carried by the spindles to three end tools.

In the tool holding and presenting mechanisms a variety of combinations may be formed with thread cutting spindles or with the thread cutting spindles changed to tool spindles which are independently adjustable and are advanced simultaneously with the tool head.

The lead cam mechanism provides for an instant change of cams having different pitches, and eliminates a source of great delay in altering the machine so that it will accomplish different kinds of work. With the construction illustrated and described these adjustments can be quickly and accurately made by any ordinary mechanic without danger of injuring the machine or spoiling or wasting stock. Long or short sections of rod can be fed and long or short portions threaded as desired and the rods are fed close to their ends so that there is very small waste when the ends are reached.

The spindle gears, which in prior machines owing to their high speed wear out quickly, in this machine run in a reservoir of oil, which oil at the same time lubricates the bearings so that the parts wear a long time. The threading spindles and the roughing tool spindle are independent of the tool slide so that the exterior cutting tools do not interfere with each other nor does the distortion of one by undue strains affect any other.

The indexing of the spindle head is positive and the locking mechanism is sure and is made in such manner that it is accurate and will operate a long time without appreciable wear, and should the teeth become somewhat worn, the indexing ring or annular rack can be turned to another position so that its teeth and the teeth of the index bolt will engage in a relatively different position. The interlocking teeth of the index mechanism are so cut as to overcome the strain caused by the central drive shaft in revolving the head and the rod spindles.

The lead cam cannot only be removed and another substituted very quickly, but it is capable of very accurate adjustment. The die starting cams are quickly adjusted and are positively operated while the levers hold the side rods back until the dies are ready to start on the stock. The roller clutches which are provided for causing the rotation of the threading spindles can be changed and used either right handed or left handed if required. The side radial tool slides are actuated by mechanisms which have but little wear, and which are positive in their action. And the slide cams can be fastened so they may be quickly removed and others substituted in the same manner as the lead cam.

The invention claimed is:

1. In a screw machine in combination, a rotatable spindle head, rotatory spindles mounted in the head, a feed tube movable longitudinally in each spindle, a longitudinally movable feed shaft extending axially through the spindle head, studs removably mounted upon and movable with the feed shaft and adapted to engage and move the feed tubes, and means for reciprocating the feed shaft, substantially as specified.

2. In a screw machine in combination a spindle head, a spindle mounted in the head, a feed tube movable longitudinally in the spindle, a longitudinally movable feed shaft extending axially through the spindle head, means mounted upon the feed shaft and adapted to engage and move the feed tube, a rocker arm. means for oscillating said arm, and an adjustable connection between said arm and the feed shaft, substantially as specified.

3. In a screw machine in combination, a spindle, a feed tube movable longitudinally in the spindle, a longitudinally movable feed shaft, means mounted upon the feed shaft and adapted to engage and move the feed tube, a rocker arm, a connection between the feed shaft and the rocker arm, an oscillating gear for rocking said arm, a rack for oscillating said gear, a removable cam for reciprocating the rack and means for rotating the cam, substantially as specified.

4. In a screw machine in combination, a spindle, a feed tube movable longitudinally in the spindle, a longitudinally movable feed shaft, means mounted upon the feed shaft and adapted to engage and move the feed tube, a rocker arm, means for rocking said arm, a connection between said arm and the feed shaft, an adjustable hub, means for rotating the hub and a cam mounted upon the hub for actuating the means for rocking the arm, substantially as specified.

5. In a screw machine in combination, a spindle, a feed tube movable longitudinally in the spindle, a longitudinally movable feed shaft, means mounted upon the feed shaft and adapted to engage and move the feed tube, a rocker arm, means for rocking said arm, a connection between said arm and the feed shaft, a cam arranged to give motion to the means for rocking the arm, a speed gear box for rotating the cam and means for rotating the gear in said box, substantially as specified.

6. In a screw machine in combination, a spindle, a feed tube movable longitudinally in the spindle, a longitudinally movable feed shaft, means mounted upon the feed shaft and adapted to engage and move the feed tube, a rocker arm, a connection between the rocker arm and the feed shaft, an oscillating gear for rocking said arm, a rack for oscillating the gear, a cam for oscillating the rack, a speed gear box for rotating the cam, a sprocket connected with the driving shaft of the gears in the speed box, a driving pulley, a sprocket wheel fastened to the pulley and a chain connecting the said sprockets, substantially as specified.

7. In a screw machine in combination, a rotatory spindle, a feed tube movable longitudinally in the spindle, a longitudinally movable feed shaft, means mounted on the feed shaft and adapted to engage and move the feed tube, a rocker arm, a connection between said arm and the feed shaft, an oscillating gear for rocking said arm, a rack for oscillating said gear, a cam for reciprocating the rack, a driving pulley loosely mounted on the cam shaft and arranged to drive said shaft by means of a pair of sprocket wheels connected by a chain, a speed box driven by said sprockets and chain, a worm driven by said speed box and a worm wheel mounted upon and fastened to the cam shaft and driven by the worm, substantially as specified.

8. In a screw machine in combination, a rotatable spindle head, a tool head movable toward and from the spindle head, a spindle mounted in the spindle head, a feed tube movable longitudinally in the spindle, a longitudinally movable feed shaft extending axially through the spindle head and through the tool head, a connection between the feed shaft and the feed tube, an oscillating pinion, means for oscillating the pinion, a rocker arm oscillated by the pinion, a connection between the rocker arm and the feed shaft, a rack oscillated by said pinion and a connection between said rack and the tool head, substantially as specified.

9. In a screw machine in combination, a rotatable spindle head, a tool head movable toward and from the spindle head, rotatory spindles mounted in the spindle head, a feed tube movable longitudinally in each spindle, a longitudinally movable feed shaft extending axially through the spindle head and through the tool head, a connection between the feed shaft and the feed tubes, an oscillating pinion, means for oscillating the pinion, a rocker arm oscillated by the pinion, a connection between the rocker arm and the feed shaft, a rack oscillated by said pinion, a connection between said rack and the tool head, threading spindles, means for rotating the threading spindles, and means moved by the oscillating pinion for controlling the threading spindle rotating mechanism, substantially as specified.

10. In a screw machine the combination with a spindle head and spindles, of a tool head having means for holding non-rotating tools, means for moving the tool head toward and from the spindle head, reciprocating spindles supported by and extending through the tool head, means for rotating the spindles forwardly, means for rotating the spindles backwardly, clutches for connecting and disconnecting the respective spindle rotating means, and means which connect said spindles with the head reciprocating means, said connecting means being arranged to give the spindles a greater movement than the tool head, substantially as specified.

11. In a screw machine the combination with the spindle head, rotatory spindles and mechanisms for rotating the head and the spindles, of a chucking mechanism comprising spring chuck jaws in each spindle, a chuck closing sleeve on each spindle, levers for moving each sleeve so that it will close the chuck jaws, a sliding wedge for actuating said levers, a collar on said wedge, a lever adapted to engage and move said collar, a cam for oscillating said lever, a sleeve arranged in the center of the spindle head and means for adjusting and fastening said sleeve in the spindle head, whereby it will engage all of the chuck collars and cause them to move simultaneously, substantially as specified.

12. In a screw machine in combination with the rotatory spindle head, a gear mounted on said head, a pinion for rotating said gear and a driving pulley, sprocket wheels driven by said pulley, a ratchet and pawl mechanism adapted to connect and disconnect one of said sprocket wheels with the head rotating pinion shaft, a cam lever controlling the engagement and disengagement of the ratchet and pawls, and an adjustable cam mounted on the driving pulley shaft for actuating said cam lever, substantially as specified.

13. In a screw machine in combination with a rotatory spindle head, a gear mounted on said head, a pinion for rotating said gear, a driving pulley, a sprocket wheel connected with the driving pulley, a sprocket wheel loose on the pinion shaft, a chain connecting said sprocket wheels, a ratchet connected with the sprocket wheel on the pinion shaft, a block on the pinion shaft, pawls carried by the block and adapted to engage the ratchet, a cam arranged to disengage the pawls from the teeth, a lever arranged to by engagement with the cam disengage the pawls from the teeth, and an adjustable cam mounted on the driving shaft for actuating the said lever, substantially as specified.

14. A mechanism for rotating a screw machine spindle head various distances having a driving pulley, a ratchet wheel arranged to be continuously driven from the driving pulley, a block adjacent to said ratchet, a pawl on said block, a cam on said block, a lever arranged to engage said cam, an adjustable cam for actuating said lever, a driving pinion rotarily connected with the pawl block, and a gear mounted on the spindle head and meshing with said driving pinion, substantially as specified.

15. In a screw machine in combination with a rotatable head and means for rotating the head intermittently, an annular rack mounted upon the head, a bar with a plural number of teeth adapted to engage the teeth of the annular rack, cams mounted on the driving shaft for reciprocating the bar, and means for rotating the cams, substantially as specified.

16. In a screw machine in combination with a rotatable head and means for rotating the head intermittently, an annular rack mounted upon the head, a bar with a plural number of teeth adapted to engage the teeth of the annular rack, a driving shaft, a pulley for rotating the driving shaft, and a three disk cam mounted on the shaft, two of such disks being adapted to withdraw the bar and the third to hold the bar with its teeth in engagement with the teeth of the annular rack, substantially as specified.

17. In combination in a screw machine, a rotatable head, means for rotating the head, spindles carried by the head, means for rotating the spindles, a tool slide mounted upon the head frame, a rack and pinion for reciprocating the tool side, an annular rack for rotating the pinion, a vertically movable rack engaging the annular rack, a cam for depressing the vertical rack and a spring for lifting said rack, substantially as specified.

18. The combination in a screw machine, a rotatable head, mechanism for rotating the head, spindles carried by the head, mechanism for rotating the spindles, tool slides movable toward and from the axes of the spindles, a shaft extending beneath the slide, hubs on said shaft near its ends, cams independently adjustable on said hubs, means projecting from the tool slides and engaging said cams, spiral gears for rotating the shaft and means for rotating the gears, substantially as specified.

19. In a screw machine the combination with a reciprocating tool head, of tools carried by the head, a cam shaft, a hub removably fixed on said cam shaft, a cam mounted on said hub, a pin projecting from one part into an angular slot in the other part for removably connecting said cam and hub, and means actuated by said cam for reciprocating the tool head and tools, substantially as specified.

20. In combination in a screw machine, a rotatable head, means for rotating the head, spindles carried by the head, means for rotating the spindles, a tool slide movable obliquely toward and from the spindle axes, a rack and pinion for reciprocating said tool slide, an annular rack and vertical rack for rotating the slide pinion, a cam on the cam shaft for reciprocating the vertical rack, tool slides movable horizontally toward and from the spindle axes, cams for moving the horizontal slides, and spiral gears driven from the cam shaft for rotating the spiral gears, substantially as specified.

21. The combination with the threading spindle of a screw machine, of a friction clutch part splined upon the spindle, a pinion loose upon the spindle, a ratchet clutch adapted to connect the pinion with the spindle, a friction clutch part adapted to engage with the spindle friction clutch part, a pinion adapted to rotate the driving part of the friction clutch, a pinion adapted to rotate the driving part of the ratchet clutch, means connecting said driving pinions and means for rotating said pinions whereby, when the friction clutch parts are engaged, the spindle is rotated rapidly thereby and when the friction clutch parts are disengaged the spindle is rotated more slowly by the ratchet clutch, substantially as specified.

22. The combination with the threading spindle of a screw machine, of a friction clutch part splined upon the spindle, a pinion loose upon the spindle, a ratchet clutch adapted to connect the pinion with the spindle, a friction clutch part adapted to engage with the spindle friction clutch part, a pinion adapted to rotate the driving part of the friction clutch, a pinion adapted to rotate the driving part of the ratchet clutch, means connecting said driving pinions, means for rotating said pinions, means for feeding the spindle and for engaging the friction clutch parts, and means for holding the friction clutch parts disengaged and controlling the feed of the spindle, substantially as specified.

23. The combination with the threading spindle of a screw machine, of a friction clutch part splined upon the spindle, a pinion loose upon the spindle, a ratchet clutch adapted to connect the pinion with the spindle, a friction clutch part adapted to engage with the spindle friction clutch part, a pinion adapted to rotate the driving part of the ratchet clutch, means connecting said driving pinions, means for rotating said pinions, a spring for feeding the spindle and for connecting the friction clutch parts, a cam controlling the engaging movement of the friction clutch parts, a lever controlling the feed of the spindle, and a cam for actuating said lever, substantially as specified.

24. The combination with the threading spindle of a screw machine, of a friction clutch part connected with the spindle, a pinion loose on the spindle, a ratchet clutch adapted to connect the pinion with the spindle, a friction clutch part adapted to be engaged with the spindle friction clutch part, a pinion adapted to rotate the driving part of the friction clutch, a pinion adapted to rotate the driving part of the ratchet clutch, means for connecting said driving pinions, a movable support for said driving pinions whereby said pinions can be thrown out of operative engagement, means for rotating said pinions, and means for preventing the rotation of the threading spindle when the gears are out of engagement, substantially as specified.

25. In a screw machine in combination, a rotatable head, means for intermittently rotating the head, rotatable spindles carried by the head, a tubular shaft extending centrally through the head, means for rotating the tubular shaft, pinions on the spindles, a pinion on the tubular shaft and meshing with the spindle pinions, stock feeding means, a feed rod extending through the tubular shaft and a connection between said feed rod and the feeding means, substantially as specified.

26. In a screw machine in combination, a spindle head, means for intermittently rotating the spindle head, a tool head, means for moving the tool head toward and from the spindle head, rotatable spindles carried by the spindle head, tool holders carried by the tool head, a tubular shaft extending centrally through the spindle head and the tool head, means operated by the central tubular shaft for rotating the spindles, stock feeding means, a feed rod extending through the tubular shaft and means operated by the feed rod for actuating the stock feeding means, substantially as specified.

27. In a screw machine in combination, a spindle head, spindles carried by the head, means for intermittently rotating the spindle head, a tool head, means for moving the tool head toward and from the spindle head, feed tubes in the spindles, a central tubular shaft for driving the spindles, a feed rod extending through the tubular shaft for operating the feed tubes, and connected means mounted on the tool head support for feeding the tool head and the feed rod independently of each other, substantially as specified.

HARRY B. LESTER.

Witnesses:
Wm. Gray,
Frank J. Oberhauser.